United States Patent [19]

Yamaguchi et al.

[11] 4,002,025
[45] Jan. 11, 1977

[54] SYSTEM FOR HEATING INTAKE PIPE OF INTERNAL COMBUSTION ENGINE

[75] Inventors: Shunzo Yamaguchi, Nishio; Tadashi Ozaki, Gamagori; Masashi Kida, Nishio; Toshiaki Konomi, Susono, all of Japan

[73] Assignees: Nippon Soken, Inc., Nishio; Toyota Jidosha Kogyo Kabushiki Kaisha, both of Japan

[22] Filed: Oct. 29, 1975

[21] Appl. No.: 627,008

[30] Foreign Application Priority Data

Oct. 31, 1974 Japan .................... 49-126423

[52] U.S. Cl. ................... 60/274; 60/289; 123/122 AB
[51] Int. Cl.² ................ F02M 31/00; F02B 75/10
[58] Field of Search ........... 60/290, 289, 284, 274; 123/122 R, 122 A, 122 AA, 122 AB, 122 G, 122 H, 179 H

[56] References Cited

UNITED STATES PATENTS

| | | | |
|---|---|---|---|
| 2,057,808 | 10/1936 | Widegren | 123/122 G |
| 2,401,862 | 6/1946 | Dugas | 123/122 G |
| 3,020,903 | 2/1962 | Kloss | 123/122 R |
| 3,687,122 | 8/1972 | Kamo | 123/179 H |
| 3,732,696 | 5/1973 | Masaki | 60/284 |
| 3,802,194 | 4/1974 | Tanasawa | 60/289 |
| 3,828,747 | 8/1974 | Nambu | 123/122 AB |

*Primary Examiner*—Douglas Hart
*Attorney, Agent, or Firm*—Cushman, Darby & Cushman

[57] ABSTRACT

A system for heating the intake pipe of an internal combustion engine including a combustion equipment disposed adjacent to the intake pipe, a fuel supply system for supplying the fuel into the combustion equipment and an air supply system including an air pump for charging the air into the combustion equipment, the intake pipe being heated by the heat generated by the combustion of the air-fuel mixture in the combustion equipment. The fuel supply system includes a main fuel injection nozzle and an auxiliary fuel injection nozzle which is controlled by control means so as to start or stop the fuel injection depending upon the operating conditions of the engine. When the engine is started, both the main and auxiliary fuel injection nozzles inject fuel so as to attain the rapid heating of the intake pipe, but when the temperature of the intake pipe exceeds a predetermined level, the injection by the auxiliary fuel injection nozzle is stopped. The heating system further includes a secondary air supply line interconnecting the air pump and the exhaust manifold of the engine and control means for controlling the flow rate of the secondary air in response to the negative pressure in the intake pipe, thereby controlling the flow rate of the air to be charged into the combustion equipment.

7 Claims, 6 Drawing Figures

SYSTEM FOR HEATING INTAKE PIPE OF INTERNAL COMBUSTION ENGINE

BACKGROUND OF THE INVENTION

The present invention relates to a system for heating the intake pipe of an internal combustion engine by the heat produced by the combustion of the air-fuel mixture in a combustion equipment in order to facilitate the complete combustion of the air-fuel mixture charged into the cylinders or combustion chambers of the engine.

There has been devised and demonstrated the prior art intake pipe or manifold heating system of the type in which the portion of the intake manifold or pipe at the downstram of the carburetor is heated by the exhaust gas or water recirculated from the radiator. But this system cannot supply the sufficient heat for vaporizing the fuel particles flowing from the carburetor. Especially when the cold engine is started so that the temperature of the exhaust gases or cooling water is low, some fuel particles are charged into the cylinders or combustion chambers, resulting in the undesired air-fuel mixture distribution among the cylinders or combustion chambers. Furthermore, this prior art system has a defect that the smooth engine operation is adversely affected when the engine is accelerated or decelerated. A further defect is that the rich air-fuel mixture must be charged in order to ensure the smooth engine operation, resulting in the emission of a relatively large quantity of pollutants.

In order to overcome the above defects, there has been devised and demonstrated a heating system of the type in which the intake manifold or pipe is heated by the heat produced by the combustion of the air-fuel mixture in a combustion equipment. However, this prior art system also has a defect that the heat or combustion gases in proportion to the air-fuel mixture produced in the carburetor cannot be attained so that there is a danger that the intake manifold or pipe is overheated or is not sufficiently heated. That is, even when the intake manifold or pipe is heated in excess of a certain temperature, the evaporation of the fuel is conversely adversely affected. Therefore, the result is the waste of the fuel in the combustion equipment. Furthermore there is a danger that the intake manifold or pipe is locally melted. On the other hand, when the intake manifold or pipe is not sufficiently heated, the atomization and evaporation of the fuel is adversely affected.

In order to overcome the above defects, the same inventor proposed a heating system of the type in which the air discharged from an air pump for supplying the secondary air to an exhaust gas purifying device is supplied to the combustion equipment as the combustion air and an air flow control valve is inserted in an air supply line interconnecting the air pump and the combustion equipment, whereby the temperature of the intake manifold or pipe may be maintained at the optimum level by controlling the flow rate of the air by the air flow control valve. However, this sytem has a defect that the temperature rising rate of the intake manifold or pipe is relatively low especially when the engine is started at low temperatures.

SUMMARY OF THE INVENTION

In view of the above, the primary object of the present invention is to provide a system for heating the intake manifold or pipe of an internal combusiton engine of the type in which when the cold engine is started or when the engine is started at low temperatures, in addition to the main fuel injection nozzle, an auxiliary fuel injection nozzle injects the additional quantity of the fuel so that the heating of the intake manifold or pipe may be accelerated thereby ensuring the satisfactory atomization and evaporation of the fuel particles flowing through the intake manifold or pipe.

Briefly stated, the present invention is characterized in that an air cutoff valve is inserted in an air line interconnecting between an air pump and an exhaust manifold or pipe for bypassing the discharged air into the exhaust manifold, and is closed when the engine is started so that all of the air discharged from the air pump may be supplied to a combustion equipment resulting in the increase of the fuel quantity to be injected.

According to one aspect of the present invention, the intake manifold or pipe heating system includes an auxiliary fuel injection nozzle in addition to the main fuel injection nozzle, and the auxiliary fuel injection nozzle is controlled in response to the operating conditions of the engine so as to start or stop the additional fuel injection, whereby the heat generated in the combustion equipment for heating the intake manifold or pipe may be easily controlled. Because of the auxiliary fuel injection nozzle, it becomes possible to heat the intake manifold or pipe to a desired temperature within a short time especially when the cold engine is started, whereby the satisfactory atomization and evaporation of the fuel particles may be attained. Furthermore, in some states of the engine, the overheating of the intake manifold or pipe and the waste of the fuel may be prevented.

According to another aspect of the present invention, an air cutoff valve which is inserted into an air line interconnecting the air pump and the exhaust manifold is so arranged as to be closed when the auxiliary fuel injection nozzle is activated to inject the additional fuel so that the sufficient quantity of combustion air may be supplied to the combustion equipment to accelerate the heating of the intake pipe when the cold engine is started. Furthermore, when the air cutoff valve is opened to supply the secondary air into the exhaust manifold, a twofold advantage that the exhaust gases may be purified by the secondary air may be attained.

The present invention provides a system for heating the intake manifold or pipe of an internal combustion engine including the intake manifold or pipe and an exhaust manifold, said system comprising a combustion equipment disposed adjacent to said intake pipe for heating the same and including a mixing chamber where the air and the fuel are mixed, a combustion chamber which is communicated with the mixing chamber and in which the air-fuel mixture is burned, and an ignition means for igniting the air-fuel mixture; a fuel supply system adapted to supply the fuel into said combustion equipment and including a main fuel injection nozzle and an auxiliary fuel injection nozzle so arranged as to inject the fuel into said mixing chamber of said combusiton equipment; an air supply system adapted to supply the air into said combustion equipment and including an air pump connected through air supply lines with said mixing chamber and said combustion chamber of said combustion equipment; and control means adapted to control said auxiliary fuel injection nozzle so as to start or stop the fuel injection into said mixing chamber depending upon the operating conditions of the engine.

The above and other objects, features and advantages of the present invention will become more apparent from the following description of one preferred embodiment thereof taken in conjunction with the accompanying drawings.

DESCRIPTION OF THE PREFERRED EMBODIMENT

Figure 1:
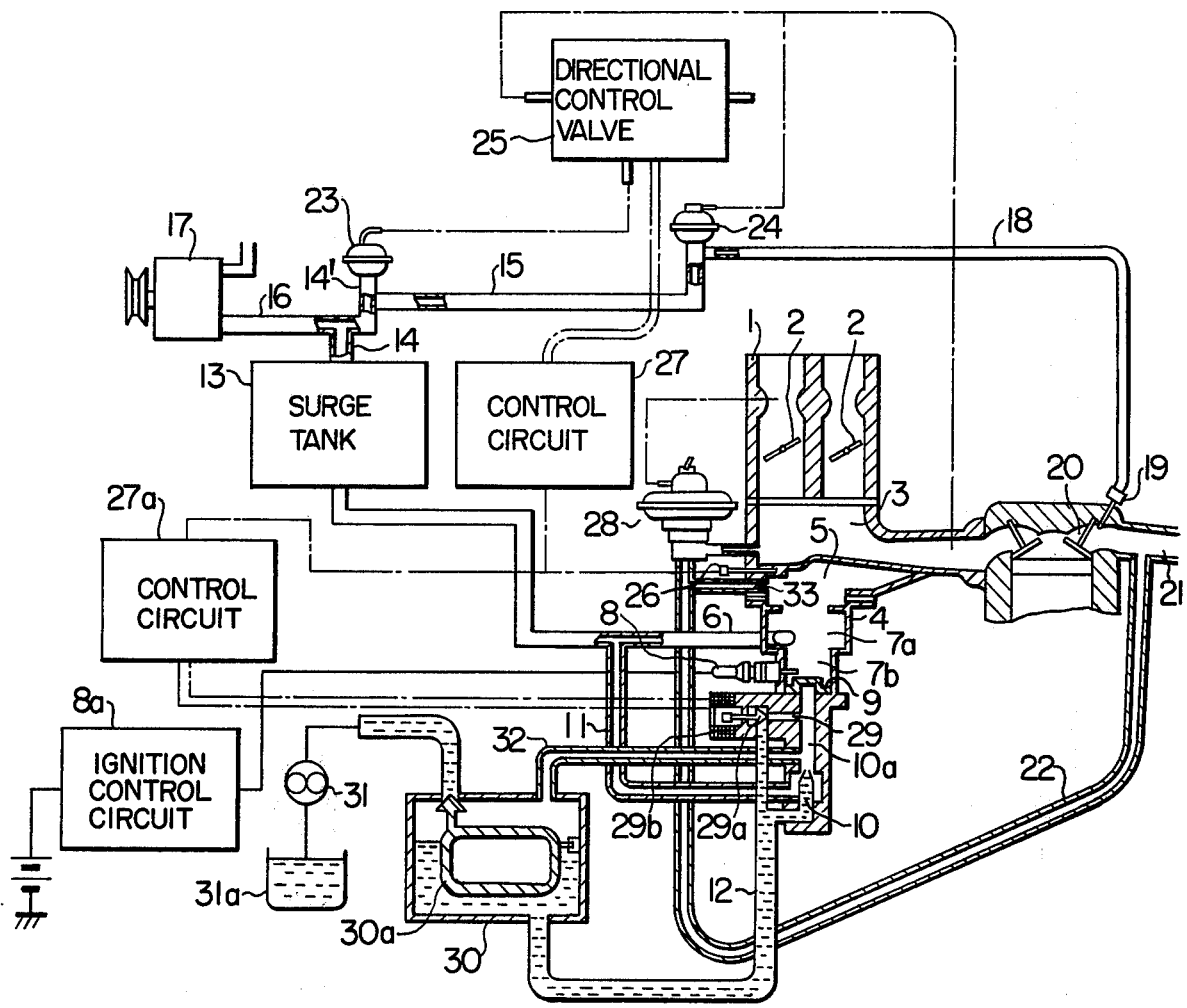
FIG. 1 is a schematic diagram, partly in section, of a preferred embodiment of a system for heating the intake manifold or pipe of an internal combustion engine in accordance with the present invention.

Referrng first to FIG. 1, reference numeral 1 denotes a carburetor with throttle valves 2; 3, an intake pipe whose lower wall portion defines the top wall of a heat-exchange chamber 5; and 4, a combustion equipment which includes a swirling type combustion chamber 7a in communication with the heat-exchange chamber 5, an ignition chamber 7b and a mixing chamber or conduit 10a. It is preferable and possible to attach suitable fins to the outside wall surface of the intake pipe 3 in order to improve the heat-exchange efficiency.

The combustion air is charged into the combustion chamber 7a from a combustion air charging pipe 6 in communication with an air pump 17 through a surge tank 13, a communication pipe 14 and a discharge pipe 16 of the air pump 17. A part of the air discharged from the air pump 17 is charged into the lower end of the mixing chamber or conduit 10a through a pipe 11 branched from the pipe 6 in order to atomize the fuel injected through a main fuel injection nozzle 10 at the bottom of the mixing chamber or conduit 10a.

In addition to the main fuel injection nozzle 10, an auxiliary fuel injection nozzle 29 whose fuel injection is controlled by a cutoff valve 29a which in turn is controlled by a solenoid 29b, is so arranged as to inject the fuel into the mixing chamber or conduit 10a. Both the main and auxiliary fuel injection nozzles 10 and 29 are communicated through a fuel supply pipe 12 with a float chamber 30 which includes a float 30a and which is hydraulically communicated through a pressure compensation pipe 32 with the mixing chamber or conduit 10a. The fuel is supplied from a fuel tank 31a by a fuel pump 31 in such a way that the fuel in the float chamber 30 may be maintained at a predetermined level by the float 30a.

An ignition plug 8 placed in the ignition chamber 7b communicated through an evaporator 9 with the mixing chamber or conduit 10a, is electrically connected through an ignition control circuit 8a of the conventional type to an electric source.

Figure 5:
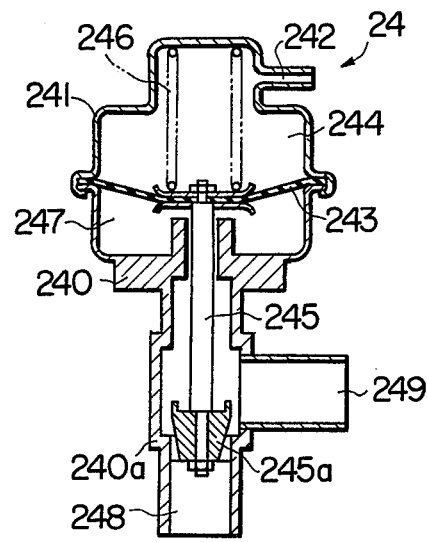
FIG. 5 is a schematic sectional view of an air flow cntrol valve.

The discharge pipe 16 of the air pump 17 is also communicated through an air pipe 14' branched from the pipe 14, an air cutoff valve 23, which is controlled by a directional control valve 25, an air pipe 15, an air flow control valve 24 to be described in detail hereinafter with reference to FIG. 5 and a secondary air supply pipe 18 with an air injection nozzle 19 adapted to inject the secondary air in the vicinity of the exhaust port 20 of the engine.

A part of the exhaust gases discharged into an exhaust manifold 21 is recirculated through an exhaust gas recirculation pipe 22 and an exhaust gas recirculation control valve 28 into the intake pipe 3. The heat-exchange chamber 5 communicates through a pipe 33 with the pipe 22. The exhaust gas recirculation control valve 28 is operated in response to the negative pressure at the Venturi in the carburetor 1 so that its opening degree may be in proportion to the intake air quantity.

A temperature sensor 26 which is embedded or inserted into a partition wall between the intake pipe 3 and the heat-exchange chamber 5, is a thermistor in the instant embodiment which exhibits the negative temperature coefficient of resistance. The output from the thermistor 26 representing the temperature of the intake pipe 3 is transmitted to control circuits 27 and 27a which respectively control the directional valve 25 and the solenoid 29b of the auxiliary fuel injection nozzle 29 as will be described in detail hereinafter with reference to FIG. 6.

Figure 2:
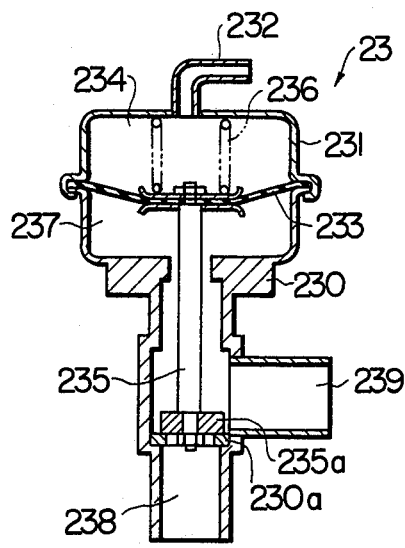
FIG. 2 is a schematic sectional view of an air cutoff valve.

Next referring to FIG. 2, the air cutoff valve 23 will be described in detail hereinafter. The cutoff valve 23 includes a diaphragm 233 whose outer periphery is fixedly secured between an upper diaphragm chamber case 231 and a lower diaphragm chamber case formed integral with a valve casing 230. An upper or first pressure chamber 234 defined by the upper case 231 and the diaphragm 233 is communicated through a pipe 232 with the directional control valve 25, and includes a bias spring 236 loaded between the top wall of the case 231 and the upper surface of the diaphragm 233. The upper end of a valve shaft or stem 235 is securely attached to the diaphragm 233, and the lower end thereof terminates into a valve body 235a which is pressed toward a valve seat 230a under the force of the bias spring 236. An air pipe 239 connected to the air pipe 15 is communicated with the lower or second pressure chamber 237 defined between the diaphragm 233 and the lower case 230. An intake pipe 238 is connected to the air pipe 14' which in turn is connected to the discharge pipe 16 of the air pump 17 (See FIG. 1).

Next the mode of operation of the air cutoff valve 23 with the above construction will be described. When the negative pressure is introduced from the directional control valve 25 through the pipe 232 into the upper or first pressure chamber 234, the diaphragm 233 is displaced upwardly in FIG. 2 against the bias spring 236 so that the valve body 235a moves away from its valve seat 230a so that the intake pipe 238 is communicated with the outlet pipe 239. On the other hand, when the directional control valve 25 transmits the atmospheric pressure into the upper or first pressure chamber 234, the diaphragm 233 moves downward under the force of the bias spring 236 so that the valve body 235a is pressed against its valve seat 230a. As a result, the communication between the intake and outlet pipes 238 and 239 is interrupted. The force of the bias spring 236 is so selected that the spring 236 may tightly press the valve body 235a against the valve seat 230a against the pressure of the air in the intake pipe 238 acting upon the valve body 235a.

Figure 3:
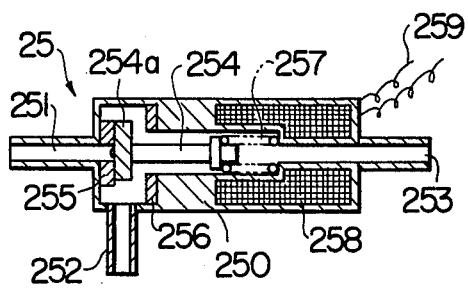
FIG. 3 is a schematic sectional view of a directional control valve.

Next referring to FIG. 3, the directional control valve 25 will be described. The valve 25 has a casing 250 to which are secured an negative pressure intake pipe 251 connected to the intake pipe 3 (See FIG. 1), an output pressure discharge pipe 252 connected to the pipe 232 of the cutoff valve 23 shown in FIG. 2 and an atmospheric pressure intake pipe 253 communicated through a filter (not shown) with the surrounding atmosphere. A valve body 254a formed at one end of a plunger 254 is pressed against a valve seat 255 on the side of the negative pressure intake pipe 251 or a valve seat 256 on the side of the atmospheric pressure intake pipe 253 depending upon whether a solenoid 258 is de-energized or energized. That is, when the solenoid 258 which is electrically connected through lead wires 259 to the control circuit 27 is energized, the plunger 254 is displaced to the right in FIG. 3 so that the valve body 254a is firmly pressed against the valve seat 256 so that the negative pressure intake pipe 251 is communicated with the output pressure discharge pipe 252. When the solenoid 258 remains de-energized, the plunger 254 is biased toward the left under the force of a spring 257 so that the valve body 254a is pressed against the valve seat 255. As a result, the atmospheric pressure intake pipe 253 may be communicated with the output pressure discharge pipe 252 and hence the upper pressure chamber 234 of the cutoff valve 23.

Next referring to FIG. 4, the detail of the control circuit 27 will be described. The control circuit 27 consists of a non-inverting amplifier 271 of the type in which the phase of the output is the same as that of the input and which includes a voltage dividing resistor R1, an input resistor R2 and a feedback resistor R3; a voltage divider consisting of resistors R4 and R5 for deriving a reference voltage; a comparator 272; and a transistor 273 whose base is connected through an input resistor R6 to the output of the comparator 272. The collector of the transistor 273 is connected to the solenoid 258 of the directional control valve 25 which is connected in parallel with a diode D1 for absorbing the counterelectromotive force. Reference numeral 274 denotes a power supply; and 275, a key switch of the engine. The junction between the resistor R1 and the thermistor or temperature sensor 26 is connected to the non-inverting input terminal of the amplifier 271.

Next referring to FIG. 5, the air flow control valve 24 will be described which is substantially similar in construction to the air-cutoff valve 23 described with reference to FIG. 2. That is, the flow control valve 24 includes a valve casing 240 which, together with an upper diaphragm chamber case 241, defines a diaphragm chamber or box which is divided by a diaphragm 243, whose outer periphery is fixedly secured between the upper diaphragm chamber case 241 and the valve casing 240, into an upper pressure chamber 244 and a lower pressure chamber 247. The upper pressure chamber 244 is communicated through a negative pressure intake pipe 242 with the intake pipe 3 (See FIG. 1), and includes a bias spring 246. The upper end of a valve shaft 245 is attached to the diaphragm 243 while the lower end thereof terminates into a valve body 245a which is moved toward or away from a valve seat 240a placed between an intake pipe 248 connected through the air pipe 15 to the outlet pipe 239 of the cutoff valve 23 and an outlet pipe 249 connected to the secondary air supply pipe 18 (See FIG. 1).

Depending upon the negative pressure transmitted into the upper pressure chamber 244 through the intake pipe 242 from the intake pipe 3 (See FIG. 1), the diaphragm 243 deflects itself so that the clearance or passage between the valve body 245a and the valve seat 240a changes. Thus, the flow rate of the secondary air flowing from the intake pipe 248 to the outlet pipe 249 may be controlled.

Figure 4:
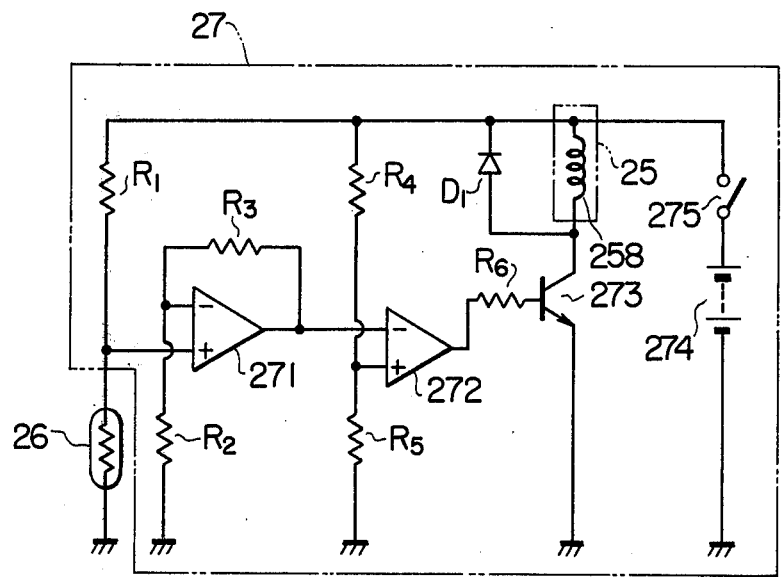
FIG. 4 is an electric wiring diagram of a first control circuit for controlling the directional control valve shown in FIG. 3.
Figure 6:
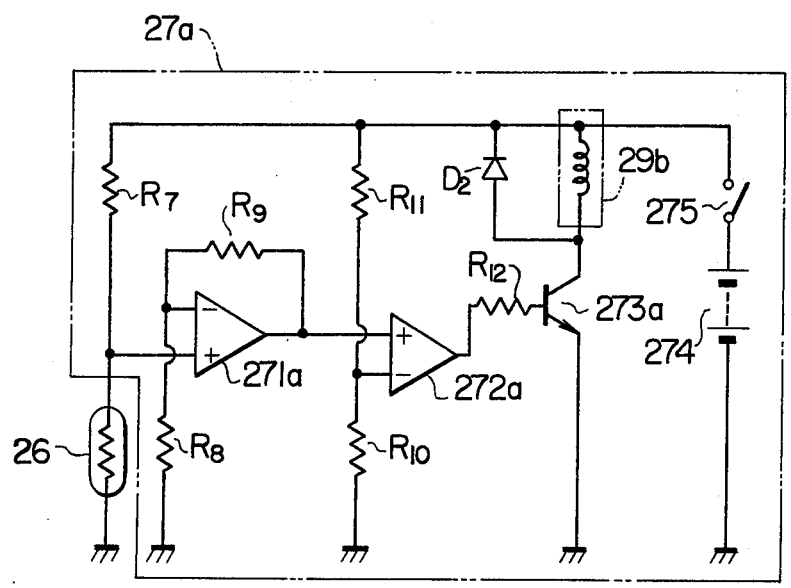
FIG. 6 is an electric wiring diagram of a second control circuit for controlling an auxiliary fuel injection nozzle.

The control circuit 27a shown in FIG. 6 is substantially similar in construction to the control circuit 27 described elsewhere with reference to FIG. 4. That is, the control circuit 27a includes a non-inverting amplifier 271a including a voltage dividing resistor R7, an input resistor R8 and a feedback resistor R9; a voltage divider consisting of resistors R10 and R11; a comparator 272a; a transistor 273a whose base is connected through an input resistor R12 to the output of the comparator 272a and whose collector is connected to the solenoid 29b of the fuel cutoff valve 29a (See FIG. 1); a counterelectromotive force absorbing diode D2 connected in parallel with the solenoid 29b; the power supply 274 and the key switch 275.

As the construction of the intake pipe heating system according to the present invention has been described in detail, the mode of operation thereof will be described. When the engine is started, the air is supplied from the air pump 17 to the combustion equipment 4. Depending upon the quantity of the air charged into the combustion equipment 4, the quantity of the fuel injected through the main fuel injection nozzle 10 is determined. The injected fuel is mixed with the air in the mixing chamber or conduit 10a, and the air-fuel mixture is ignited in the ignition chamber 7b by the ignition plug 8 and is burned in the combustion chamber 7a. The combustion products flow into the heat-exchange chamber 5 to heat the intake pipe 3. In response to the temperature of the partition wall between the intake pipe 3 and the heat-exchange chamber 5 which temperature is detected by the sensor 26, both the control circuits 27 and 27a control the directional control valve 25 and the fuel cutoff valve 29a, respectively, which in turn control the air cutoff valve 23 and the auxiliary fuel injection nozzle 29, respectively.

More particularly, when the cold engine is started, the temperature of the intake pipe 3 is low so that the resistance of the temperature sensor or thermistor 26 is high. As a result, the output from the non-inverting amplifier 271 is higher than the reference level determined by the voltage divider consisting of the resistors R4 and R5 so that the output from the comparator 272 drops to a low level. Then the transistor 273 is turned off so that no current flows into the solenoid of the directional control valve 25. The plunger 254 is displaced under the force of the bias spring 257 so that the valve body 254a is firmly pressed against the valve seat 255. As a result, the communication between the atmospheric pressure intake pipe 253 and the output pipe 252 is established so that the atmospheric pressure is transmitted through the intake pipe 232 into the upper or first pressure chamber 234 of the air cutoff valve 23. The valve body 235a is pressed against the valve seat 230a under the force of the bias spring 236 so that the communication between the intake and outlet pipes 238 is interrupted. Therefore all of the air discharged from the air pump 17 is supplied to the combustion equipment 4. As the flow rate of the air flowing through the air supply pipe 11 into the mixing chamber or conduit 10a where the main fuel injection nozzle 10 is opened, is increased, the quantity of the fuel injected is increased accordingly due to he Venturi effect. In order to attain the accelerated heating of the intake pipe 3 which is cold, the additional fuel is also injected through the auxiliary fuel injection nozzle 29. That is, when the cold engine is started, the output from the comparator 272a of the control circuit 27a rises to a high level so that the transistor 273a is turned on. As a result, the solenoid of the fuel cutoff valve 29a is energized to open the valve 29a so that the fuel may be injected through the auxiliary fuel injection nozzle 29. Thus, the increased quantity of rich air-fuel or combustion mixture is supplied into the combustion equipment 4 so that the rapid heating of the intake pipe 3 to a desired temperature may be attained when the cold engine is started.

When the intake pipe 3 is sufficiently heated, for example, to about 100° C, the resistance of the thermistor 26 decreases so that the output from the non-inverting amplifier 271 falls below the reference level of the comparator 272. As a result the transistor 273 is conducted so that the solenoid 258 of the directional control valve 25 is energized. The plunger 254 is displaced to the right in FIG. 3, whereby the valve body 254a is pressed against the valve seat 256. Then the negative pressure intake pipe 251 is communicated with the output pipe 252 so that the negative pressure is transmitted into the upper or first pressure chamber 234 of the air cutoff valve 23. The valve body 235a is moved away from the valve seat 230a so that the intake pipe 238 may be communicated with the outlet pipe 239. Therefore, a part of the air discharged from the air pump 17 is supplied through the secondary air supply pipe 18 to the air injection nozzle 19 where the secondary air is injected into the exhaust manifold 21.

Since the flow rate of the secondary air supplied to the exhaust manifold 21 is controlled by the flow control valve 24, the flow rate of the air to be supplied to the combustion equipment 4 is also controlled by the control valve 24. The opening degree of the flow control valve 24 is dependent upon the magnitude of the negative pressure transmitted into the upper pressure chamber 244 of the flow control valve 24 (See FIG. 5), the magnitude of the air pressure transmitted into the lower pressure chamber 247 of the valve 24 and the force of the bias spring 246.

In response to the output signal from the temperature sensor 26, the output from the comparator 272a of the control circuit 27a (See FIG. 6) drops to a low level so that the transistor 273a is turned off. Therefore the solenoid 29b is de-energized so that the fuel cutoff valve 29a is closed. As a result, the auxiliary fuel injection nozzle 29 is cut off so that the fuel is supplied to the combustion equipment 4 only through the main fuel injection nozzle 10.

In summary, according to the present invention, after the engine has been started so that the temperature of the intake pipe 3 has been elevated to a predetermined temperature, depending upon the operating conditions (that is, the negative pressure of the intake air and the discharge pressure of the air pump 17 in the instant embodiment), the opening degree of the air flow control valve 24 is determined so that the quantity of the air to be supplied to the combustion equipment 4 is determined, and in response to the quantity of the air supplied to the combustion equipment 4 the quantity of the fuel to be injected therein through the main fuel injection nozzle 10 is determined. The intake pipe 3 is therefore heated by the heat energy produced by the combustion of the air-fuel mixture thus produced.

Even when the negative pressure transmitted into the upper or first pressure chamber 234 of the air cutoff valve 23 is considerably increased negatively in such a case where, for example, the engine is accelerated, the positive pressure of the air discharged from the air pump 17 is transmitted into the lower or second pressure chamber 237 so that the valve body 235a may remain moved away from the valve seat 230a.

The combustion gases in the heat-exchange chamber 5 is joined to the exhaust gases flowing through the exhaust gas recirculation pipe 22 and then recirculated into the intake pipe 3 at a flow rate controlled by the control valve 28 whose degree of opening is determined by the negative pressure at the Venturi of the carburetor. Thus, the air pollution problem caused by the direct discharge of the combustion products into the atmosphere may be overcome. At the same time, the emission of the nitrogen oxides (NOx) may be minimized by the recirculation of the exhaust gases.

In the instant embodiment, the air cutoff valve 23 and the fuel cutoff valve 29a have been described as being controlled in response to the output signal from the temperature sensor 26, but it is to be understood that any suitable timer circuit may be incorporated in the system in such a way that the fuel cutoff valve 29a may be opened while the air cutoff valve 23 may be closed for a predetermined time, for instance 30 to 60 seconds, after the engine was started.

In the instant embodiment, the air cutoff valve 23 and the fuel cutoff valve 29a are provided and operated simultaneously in the manner described above, but it is to be understood that the air cutoff valve 23 may be eliminated. That is, the main fuel injection nozzle 10 is so arranged that a relatively lean air-fuel mixture may be produced, and when the engine is started or is cold, in order to enhance the heating of the intake pipe 3, the auxiliary fuel injection nozzle 29 injects the fuel in such a quantity that the overall air-fuel ratio may be equal to the theoretical mixture ratio. Alternatively, when the engine is started or is cool, first the fuel cutoff valve 29a is closed and then the air cutoff valve 23 is opened so that the combustion temperature in the combustion equipment 4 may be decreased stepwise.

What we claim is:
1. In an internal combustion engine including an intake pipe and an exhaust manifold,
    a system for heating the intake pipe comprising
    a. a combustion equipment disposed adjacent to said intake pipe for heating the same and including
        a mixing chamber where the air and fuel are mixed, a combustion chamber which is communicated with said mixing chamber and in which the air-fuel mixture is burned, and
        an ignition means for igniting the air-fuel mixture;
    b. a fuel supply system adapted to supply the fuel into said combustion equipment and including a main fuel injection nozzle and an auxiliary fuel injection nozzle so arranged as to inject the fuel into said mixing chamber of said combustion equipment;
    c. an air supply system adapted to supply the air into said combustion equipment and including an air pump connected through air supply lines with said mixing chamber and said combustion chamber of said combustion equipment; and d. control means adapted to control said auxiliary fuel injection nozzle so as to start or stop the fuel injection into said mixing chamber depending upon an operating condition of the engine.

2. A system for heating the intake pipe as set forth in claim 1 wherein said control means comprises
a. temperature sensor means adapted to detect the temperature of said intake pipe,
b. a fuel cutoff valve means adapted to open or close said auxiliary fuel injection nozzle,
c. a first solenoid means adapted to open or close said fuel cutoff valve, and
d. a first control circuit means adapted to control the energization and de-energization of said first solenoid means in response to the output signal from said temperature sensor means,
whereby the fuel injection by said auxiliary fuel injection nozzle into said mixing chamber of said combustion equipment may be cut off when the temperature of said intake pipe exceeds a first predetermined level.

3. A system for heating the intake pipe as set forth in claim 1 further including
a. air supply line means so arranged as to interconnect the discharge port of said air pump with said exhaust manifold of the engine for supplying the air discharge from said air pump into said exhaust manifold, and
b. an air cutoff means inserted in said air supply line means and arranged in such a way that in response to the operating conditions of the engine said air cutoff means may cut off the air flow flowing through said air supply line means from said air pump to said exhaust manifold.

4. A system for heating the intake pipe as set forth in claim 3 wherein said air cutoff means includes
A. a control valve means comprising
 a. a valve casing hydraulically inserted in said air supply line means and including a diaphragm chamber or box with a diaphragm defining a pressure chamber and being adapted to be displaced in response to the pressure in said pressure chamber, and
 b. a control valve firmly attached to said diaphragm so as to open or close said air supply line means as said diaphragm is displaced;
B. a directional control valve means hydraulically communicated with said control valve means adapted to be selectively moved to a first position where said directional control valve means permits the communication between said pressure chamber of said control valve means and the surrounding atmosphere or to a second position where said directional control valve means permits the communication between said pressure chamber of said air control valve means and said intake pipe;
C. a second solenoid means adapted to selectively move said directional control valve means to said first or second position, and
D. a second control circuit means adapted to energize or de-energize said second solenoid means in response to the output from said temperature sensor means,
whereby said pressure chamber of said air control valve means may be kept in communication with the surrounding atmosphere until the temperature of said intake pipe exceeds a second predetermined level so as to cut off said air supply line means.

5. A system for heating the intake pipe as set forth in claim 3 further including
an air flow control valve means pneumatically inserted in said air supply line means and adapted to control the flow rate of the air flowing through said air supply line means,
said air flow control valve means including
a. a valve casing means communicated with said air supply line means and including a diaphragm chamber or box with a diaphragm dividing said diaphragm chamber or box into a second pressure chamber in communication with said intake pipe and a third pressure chamber in communication with said air supply line means,
said diaphragm being adapted to be displaced in response to the pressure differential between said second and third pressure chambers, and
b. a valve head means attached to said diaphragm and movable in unison with said diaphragm toward or away from a valve seat means disposed within said third pressure chamber so as to change the clearance or passage between said valve head means and said valve seat means,
whereby in response to the pressure differential between said second and third pressure chambers, the flow rate of the air flowing through said air supply line means may be changed.

6. In an internal combustion engine including an intake pipe and an exhaust manifold,
a system for heating the intake pipe comprising
a. a first means disposed adjacent to said intake pipe for firing air-fuel mixture;
b. second means connected to said first means for supplying air to said first means;
c. third means connected to said first means for supplying main fuel to said first means, the amount thereof being controlled so as to be in proportion to that of said air supplied by said second means;
d. fourth means connected to said first means for supplying additional fuel to said first means; and
e. fifth means coupled to said fourth means for controlling the amount of said additional fuel in response to an operational condition of the engine.

7. In an internal combustion engine including a combustion chamber for firing air-fuel mixture, an intake pipe for supplying air-fuel mixture to said combustion chamber, an exhaust manifold connected to said combustion chamber for introducing the exhaust gases to the atmosphere, and a combustion equipment disposed adjacent to said intake pipe for heating the same, thereby to ensure the complete combustion of said air-fuel mixture,
a method for heating said intake pipe comprising the steps:
a. supplying air to said combustion equipment;
b. supplying main fuel to said combustion equipment, the amount thereof being so controlled as to be in proportion to that of said air;
c. supplying additional fuel to said combustion equipment; and
d. controlling the amount of said additional fuel in response to an operational condition of the engine.

* * * * *